US009456452B2

(12) United States Patent
Kim et al.

(10) Patent No.: US 9,456,452 B2
(45) Date of Patent: Sep. 27, 2016

(54) SCHEDULING METHOD OF MULTI-USER MULTI-INPUT MULTI-OUTPUT COMMUNICATION SYSTEM

(71) Applicant: SNU R&DB FOUNDATION, Seoul (KR)

(72) Inventors: Chong Kwon Kim, Seoul (KR); Kyu Haeng Lee, Seoul (KR)

(73) Assignee: SNU R&DB FOUNDATION, Seoul (KR)

( * ) Notice: Subject to any disclaimer, the term of this patent is extended or adjusted under 35 U.S.C. 154(b) by 114 days.

(21) Appl. No.: 14/629,774

(22) Filed: Feb. 24, 2015

(65) Prior Publication Data

US 2015/0245373 A1    Aug. 27, 2015

(30) Foreign Application Priority Data

Feb. 25, 2014  (KR) .................. 10-2014-0021894

(51) Int. Cl.
*H04W 4/00* (2009.01)
*H04W 72/12* (2009.01)
*H04B 7/04* (2006.01)
*H04W 84/12* (2009.01)

(52) U.S. Cl.
CPC ....... *H04W 72/1226* (2013.01); *H04B 7/0452* (2013.01); *H04W 84/12* (2013.01)

(58) Field of Classification Search
USPC ........ 370/229, 236, 252, 328, 329, 332, 334
See application file for complete search history.

(56) References Cited

U.S. PATENT DOCUMENTS

| | | | | |
|---|---|---|---|---|
| 2008/0117815 A1* | 5/2008 | Kim | ................. | H04B 7/0452 370/230 |
| 2010/0220601 A1* | 9/2010 | Vermani | ............. | H04W 28/04 370/248 |
| 2015/0009921 A1* | 1/2015 | Papadopoulos | ....... | H04L 5/0023 370/329 |
| 2015/0071190 A1* | 3/2015 | Lau | .................. | H04B 7/0417 370/329 |
| 2015/0131751 A1* | 5/2015 | Bayesteh | ............ | H04B 7/0413 375/267 |
| 2015/0189644 A1* | 7/2015 | Lorca Hernando | .... | H04B 7/024 370/329 |
| 2015/0236766 A1* | 8/2015 | Papadopoulos | ...... | H04B 7/0452 370/329 |
| 2015/0326285 A1* | 11/2015 | Zirwas | ................ | H04B 7/0452 375/267 |
| 2016/0192229 A1* | 6/2016 | Liu | ...................... | H04L 1/0026 455/423 |

OTHER PUBLICATIONS

"A MU-MIMO User Scheduling Mechanism based on Active CSI Exchange" by Kyu Haeng Lee et al., Journal of KIISE, vol. 41 No. 4, Aug. 2014.

\* cited by examiner

Primary Examiner — Kwang B Yao
Assistant Examiner — Nguyen Ngo
(74) Attorney, Agent, or Firm — Polsinelli PC

(57) ABSTRACT

Provided is a scheduling method of a multi-user multi-input multi-output (MIMO) communication system. The scheduling method includes transmitting a channel state information request signal to a user equipment when data to be transmitted to the user equipment is received, and calculating, by the user equipment receiving the channel state information request signal, an effective channel gain of the user equipment, determining whether channel state information (CSI) is capable of being transmitted, and transmitting the CSI of the user equipment according to a result of the determining. Also, the scheduling method includes determining whether the CSI is received from the user equipment within a predetermined standby time, and when the CSI is received within the predetermined standby time, performing scheduling of the user equipment which has transmitted the CSI, determining whether a degree of freedom remains, and transmitting the channel state information request signal to another user equipment, from which CSI is not received, when the degree of freedom remains.

10 Claims, 6 Drawing Sheets

SCHEDULING METHOD OF MULTI-USER MULTI-INPUT MULTI-OUTPUT COMMUNICATION SYSTEM

CROSS-REFERENCE TO RELATED APPLICATIONS

This application claims priority under 35 U.S.C. §119 to Korean Patent Application No. 10-2014-0021894, filed on Feb. 25, 2014, the disclosure of which is incorporated herein by reference in its entirety.

TECHNICAL FIELD

The present invention relates to a scheduling method of a multi-user multi-input multi-output (MIMO) communication system, and more particularly, to a scheduling method of a multi-user MIMO communication system, in which a plurality of user equipment are scheduled based on the active exchange of channel state information (CSI), and then, an access point (AP) or a base station transmits data to the user equipment, thereby enhancing data transmission efficiency.

BACKGROUND

As a method of increasing data transmission efficiency in a wireless communication system, there is MIMO technology.

An MIMO scheme is categorized into a single-user MIMO (SU-MIMO) scheme and a multi-user MIMO (MU-MIMO) scheme depending on whether pieces of data are capable of being simultaneously transmitted by using the same band when transmitting the pieces of data to a number of users.

It is known that the MU-MIMO scheme of simultaneously transmitting different data to a number of users by using the same band obtains higher frequency efficiency than that of the SU-MIMO scheme based on a multi-user diversity gain and a space multiplexing gain.

A performance of wireless communication is largely enhanced through beamforming of the MU-MIMO scheme. The beamforming concentrates transmission energy on one user or a specific user group, thereby increasing a signal-to-noise ratio (SNR) or a transmission speed.

The MU-MIMO scheme enhances performance by using an appropriate user scheduling technique of an access point (AP) or a base station (BS). For example, a diversity gain is obtained by simultaneously providing a service to users which have a good channel condition, or a multiplexing gain is obtained by simultaneously providing a service to users which use an orthogonal channel.

However, an issue of determining a user set capable of optimizing a gain is relevant to an issue of optimally allocating a beamforming matrix and transmission power, and thus, it is unable to easily make a conclusion.

Generally, in a case of using a beamforming strategy such as zero-forcing beamforming (ZFBF), a beamforming matrix is easily calculated, but brute-force search is still needed for user scheduling. For this reason, researchers propose a greedy algorithm which ensures sub-optimality and is low in complexity.

However, it is assumed that most of user scheduling algorithms already and accurately know all or most CSI before executing an algorithm.

In reality, it is impossible to obtain CSI from all users before transmission in an actual system. To this end, the amount of CSI is reduced by using a compression technique, but a process of transmitting a feedback acts as an overhead in a media access control (MAC) layer.

Moreover, the excessive compression of CSI largely restricts a performance of user scheduling.

SUMMARY

Accordingly, the present invention provides a scheduling method of a multi-user MIMO communication system, in which a plurality of user equipment are scheduled based on the active exchange of CSI, and then, an access point or a base station transmits data to the user equipment, thereby enhancing data transmission efficiency.

In one general aspect, a scheduling method of a multi-user multi-input multi-output (MIMO) communication system includes: transmitting a channel state information request signal to a user equipment when data to be transmitted to the user equipment is received; calculating, by the user equipment receiving the channel state information request signal, an effective channel gain of the user equipment, determining whether channel state information (CSI) is capable of being transmitted, and transmitting the CSI of the user equipment according to a result of the determining; determining whether the CSI is received from the user equipment within a predetermined standby time; and when the CSI is received within the predetermined standby time, performing scheduling of the user equipment which has transmitted the CSI, determining whether a degree of freedom remains, and transmitting the channel state information request signal to another user equipment, from which CSI is not received, when the degree of freedom remains.

The transmitting of the channel state information request signal may include receiving data which is to be transmitted to the user equipment, and transmitting the channel state information request signal to a user equipment, which is set as a first user equipment, when the channel state information request signal is transmitted for the first time.

The transmitting of the channel state information request signal may include receiving the data which is to be transmitted to the user equipment, and transmitting the channel state information request signal to a plurality of user equipment, from which CSI is not received, when the channel state information request signal is not a signal which is transmitted for the first time.

The channel state information request signal, which is transmitted to the plurality of user equipment from which the CSI is not received, may include an effective channel vector which is calculated based on previously received CSI.

The scheduling method may further include calculating, by a user equipment which receives the channel state information request signal including the effective channel vector, an effective channel gain by using the effective channel vector, determining whether another user equipment has transmitted CSI, and terminating a CSI transmitting operation when the other user equipment has transmitted the CSI.

The scheduling method may further include calculating, by the user equipment which receives the channel state information request signal including the effective channel vector, the effective channel gain by using the effective channel vector, and when the other user equipment does not transmit the CSI, determining whether an order in which the user equipment transmits CSI arrives.

The scheduling method may further include calculating, by the user equipment, a projection matrix on a basis of the effective channel vector to obtain the effective channel gain.

When the order in which the user equipment transmits the CSI does not arrive, the other user equipment may determine whether another user equipment transmits CSI, and when the order in which the user equipment transmits the CSI arrives, the other equipment may transmit the CSI.

The determining of whether the CSI is received may include: when the CSI is not received from the user equipment within the predetermined standby time, terminating scheduling; extracting a beamforming matrix, based on all CSI received from a plurality of user equipment; and transmitting data to the user equipment.

The determining of whether the degree of freedom remains may include: when it is determined the degree of freedom does not remain, terminating scheduling; extracting a beamforming matrix, based on all CSI received from a plurality of user equipment; and transmitting data to the user equipment.

Other features and aspects will be apparent from the following detailed description, the drawings, and the claims.

DETAILED DESCRIPTION OF EMBODIMENTS

Figure 1:
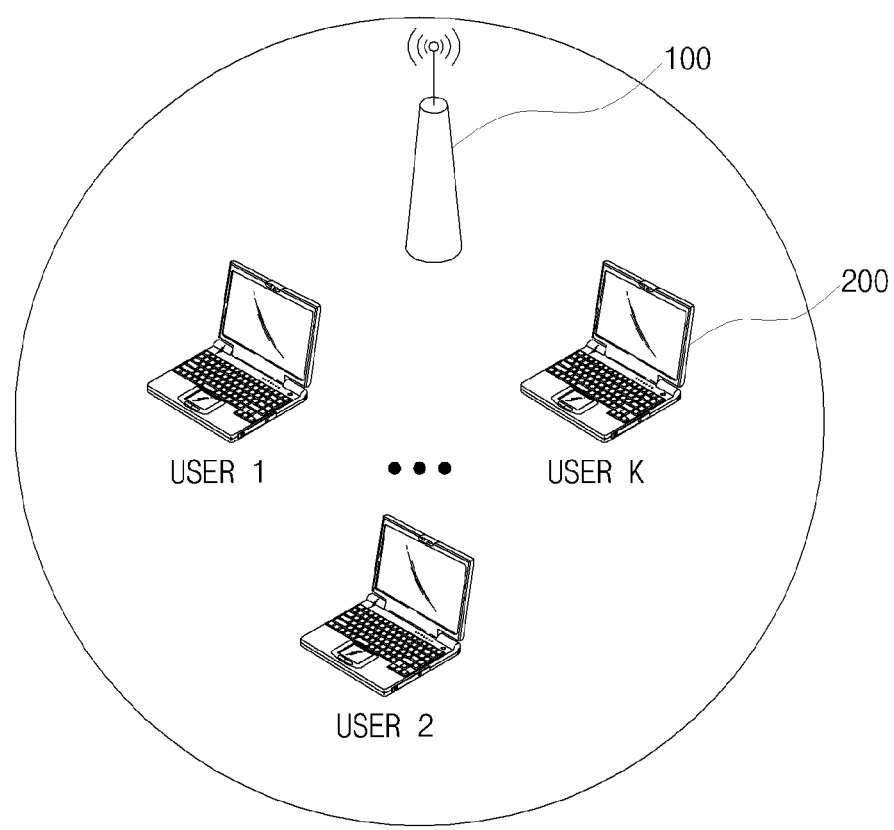
FIG. 1 is a schematic diagram illustrating a network structure according to an embodiment of the present invention.

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Like reference numerals refer to like elements throughout.

Detailed descriptions related to well-known functions or configurations will be ruled out in order not to unnecessarily obscure subject matters of the present invention. Moreover, the terms used henceforth have been defined in consideration of the functions of the present invention, and may be altered according to the intent of a user or operator, or conventional practice. Therefore, the terms should be defined on the basis of the entire content of this specification.

Hereinafter, a scheduling method of an MU-MIMO communication system according to an embodiment of the present invention will be described in detail with reference to the accompanying drawings.

Figure 2:
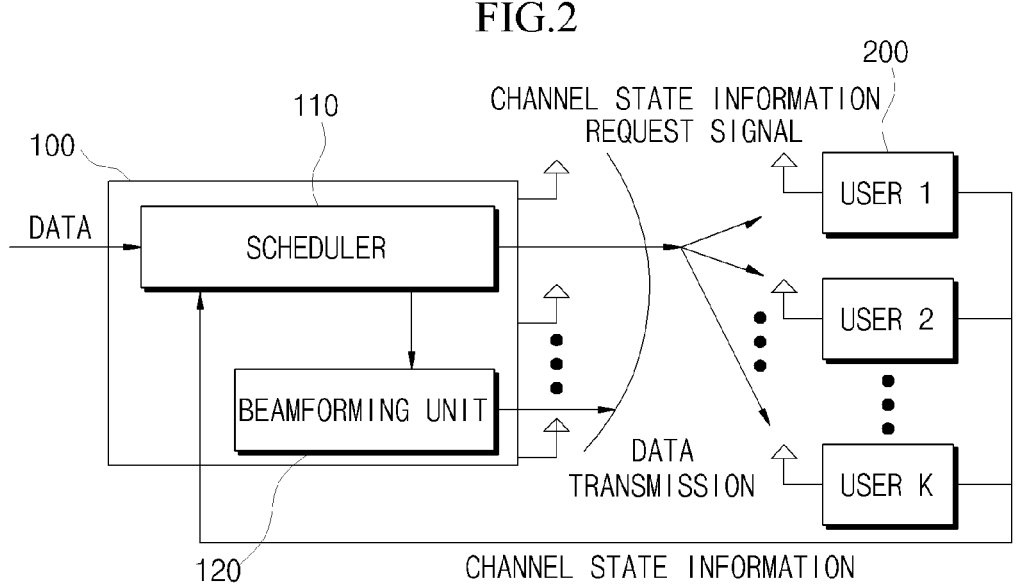
FIG. 2 is a block diagram of an MU-MIMO communication system according to an embodiment of the present invention.

FIG. 1 is a schematic diagram illustrating a network structure according to an embodiment of the present invention. FIG. 2 is a block diagram of an MU-MIMO communication system according to an embodiment of the present invention.

Referring to FIGS. 1 and 2, the MU-MIMO communication system according to an embodiment of the present invention includes a multi-data transmitter 100 such as a base station or an access point including a plurality of antennas and a plurality of user equipment 200 that receive data transmitted from the multi-data transmitter 100.

The multi-data transmitter 100 simultaneously transmits different data to the plurality of user equipment 200, and the plurality of user equipment 200 receive reception target data among the data transmitted to the multi-data transmitter 100.

The multi-data transmitter 100 may include a scheduler 110, which performs scheduling of the plurality of user equipment 200, and a beamforming unit 120 that performs beamforming of corresponding data, which is to be transmitted to the user equipment 200 scheduled by the scheduler 110, to output data.

Moreover, the scheduler 110 transmits a channel state information request signal to the plurality of user equipment 200, receives CSI transmitted from the plurality of user equipment 200, and performs scheduling of the user equipment 200.

The scheduler 110 adds the CSI about the scheduled user equipment 200 into the channel state information request signal, and transmits the CSI to the plurality of user equipment 200. In this case, CSI associated with a user equipment that transmits previous CSI included in the channel state information request signal is referred to as a channel hint.

When the scheduler 110 receives CSI from an arbitrary user equipment 200, the scheduler 110 calculates an effective channel vector (ECV) for the CSI, adds the ECV into the channel state information request signal, and transmits the ECV to the plurality of user equipment 200.

Therefore, an ECV of a latest-scheduled user equipment 200 is included in the channel state information request signal transmitted by the scheduler 100, and thus, whenever the plurality of user equipment 200 receive the channel state information request signal, the plurality of user equipment 200 may quickly calculate a projection matrix to obtain an effective channel gain (ECG). This will be described below in detail.

According to the present embodiment, scheduling of the user equipment 200 is performed in the middle of exchanging CSI. To this end, the multi-data transmitter 100 transmits the channel state information request signal the scheduled user equipment 200. The user equipment 200 receiving the channel state information request signal calculates the ECG, and only the user equipment 200 in which a highest gain is expected transmits its CSI to the multi-data transmitter 100. Such a process is repeated while a degree of freedom (DoF) of the multi-data transmitter 100 is being satisfied.

Such a user scheduling algorithm obtains a scheduling gain by exchanging a very small number of CSI, thereby considerably enhancing a performance of the MU-MIMO communication system.

There is a problem which should be solved for implementing user scheduling according to an embodiment of the present invention. First, when the scheduler 110 of the multi-data transmitter 100 generates the channel state information request signal, a balance should be maintained in terms of an overhead and efficiency. Generally, as more information is added to the channel state information request signal, ECGs of the plurality of user equipment 200 become accurate, but a data size of the channel state information request signal increases. To this end, the multi-data transmitter 100 transmits an ECV of the user equipment 200 which has transmitted the CSI last, leading to a minimum MAC overhead.

Moreover, since the plurality of user equipment 200 cannot determine how good their ECGs are in a distributed environment, a competition mechanism for transmitting the CSI is necessarily needed. However, since a collision problem can occur, the present invention uses a delay transmission scheme for solving the collision problem.

That is, the plurality of user equipment 200 delay transmission of the CSI according to their ECGs, and the user equipment 200 which has a high ECG may relatively faster transmits the CSI than the other user equipment 200.

In the MU-MIMO communication system, the multi-data transmitter 100 simultaneously transmits different data to the plurality of user equipment 200 at a predetermined time. In this case, it is required to remove interference between the plurality of user equipment 200, but dirty paper coding (DPC) which is known as the most accurate method of removing the interference cannot actually be implemented due to high calculation complexity. As an alternative, algorithms (for example, ML, MMSE, and ZF) based on a linear beamforming technique show a result similar to that of the DPC, and thus may be considered for actual use. In the present invention, ZFBF is used, and it is assumed that the multi-data transmitter 100 allocates the same power to each stream.

Generally, a precoding matrix of the ZFBF is defined as pseudo-inverse of a channel matrix "H(S)" of a user equipment set "S".

In the present invention, scheduling of a user equipment is performed by using an ECG of the user equipment.

An ECV "$e_k$" for an arbitrary user equipment channel "$h_k$" is construed as a part in which the user equipment channel "$h_k$" is orthogonally projected on an effective channel vector space of each of a plurality of scheduled user equipment, and the ECV "$e_k$" may be calculated as expressed in the following Equation (1):

$$e_k = h_k - \sum_{j=1}^{|S|} \frac{h_k e_{(j)}^*}{\|e_{(j)}\|^2} e_{(j)} \qquad (1)$$

$$= h_k \left(1 - \sum_{j=1}^{|S|} \frac{e_{(j)}^* e_{(j)}}{\|e_{(j)}\|^2}\right)$$

$$= h_k Q(S)$$

where I denotes a single matrix, and Q(S) is a projection matrix.

In this case, an ECG of a user equipment "k" is "$\|e_k\|^2$". In a first-scheduled user equipment, an ECV is a its channel itself ($e_{(1)} = h_{(1)}$).

In an orthogonal frequency division multiple (OFDM) system, an average of ECGs for all subcarriers may be calculated as an ECG. When it is assumed that $e_k[c]$ is an ECG for each subcarrier "c" and $N_c$ is the number of subcarriers, the following Equation (2) is established.

$$\|e_k\|^2 = \frac{1}{N_c} \sum_{c=1}^{N_c} \|e_k[c]\|^2 \qquad (2)$$

As the simplest method of generating the channel state information request signal, the projection matrix may be used. In this case, each of a plurality of user equipment easily calculates an ECG by multiplying its channel and the channel state information request signal, but it is required to transmit an M×M matrix for all subcarriers. Therefore, in a feedback process, the maximum number of channel vectors added to the channel state information request signal is "(M−1)MN$_c$".

On the other hand, the multi-data transmitter 100 may use, as the channel state information request signal, received CSI of the user equipment 200 as-is. However, in this case, since the plurality of user equipment 200 calculate an ECV and an ECG each time, a calculation burden is large.

Therefore, in the present invention, when the multi-data transmitter 100 receives CSI from an arbitrary user equipment 200, the multi-data transmitter 100 calculates an ECV for the CSI to generate the ECV as the channel state information request signal. Accordingly, an ECV of a latest-scheduled user equipment 200 is added into a poll frame each time.

By maintaining only an addition part of Equation (2), each of the plurality of user equipment 200 quickly calculates the projection matrix whenever the channel state information request signal is received, thereby obtaining an ECG.

Figure 3:
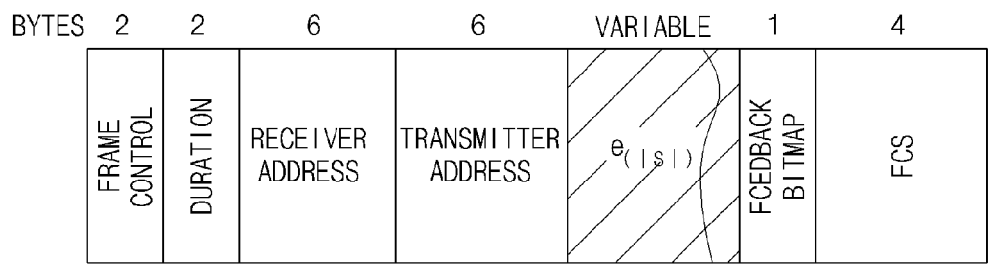
FIG. 3 is a diagram illustrating a structure of a data frame of a channel state information request signal applied to the present invention.

FIG. 3 is a diagram illustrating a structure of a data frame of a channel state information request signal applied to the present invention.

As illustrated in FIG. 3, one ECV is always included in the channel state information request signal, and thus, a maximum of (M−1)MN$_c$ vectors are additionally needed. Here, it may be considered that pulling M−1 number of user equipment 200 is better than adding M−1 number of channel vectors. However, it takes a long time to additionally pull the M−1 user equipment 200, but an obtainable scheduling result cannot always ensure an increase in a transmission capacity. For this reason, pulling the M−1 user equipment 200 is inefficient.

In transmitting the channel state information request signal, the multi-data transmitter 100 may allow only specific user equipment 200 to participate in a feedback competition. For example, the multi-data transmitter 100 may not use CSI of the user equipment 200 which is not included in a downlink packet queue.

Various methods may be used for displaying the user equipment 200 which is a target to participate in the feedback competition. For example, there is a method of changing a null data packet announcement (NDPA) frame. That is, in an STA info field of a frame, an identifier (ID) of each user may be mapped to a bit position and used. This does not cause a change in a frame structure, and thus is simple and efficient. A detailed description on this is omitted.

Figure 4:
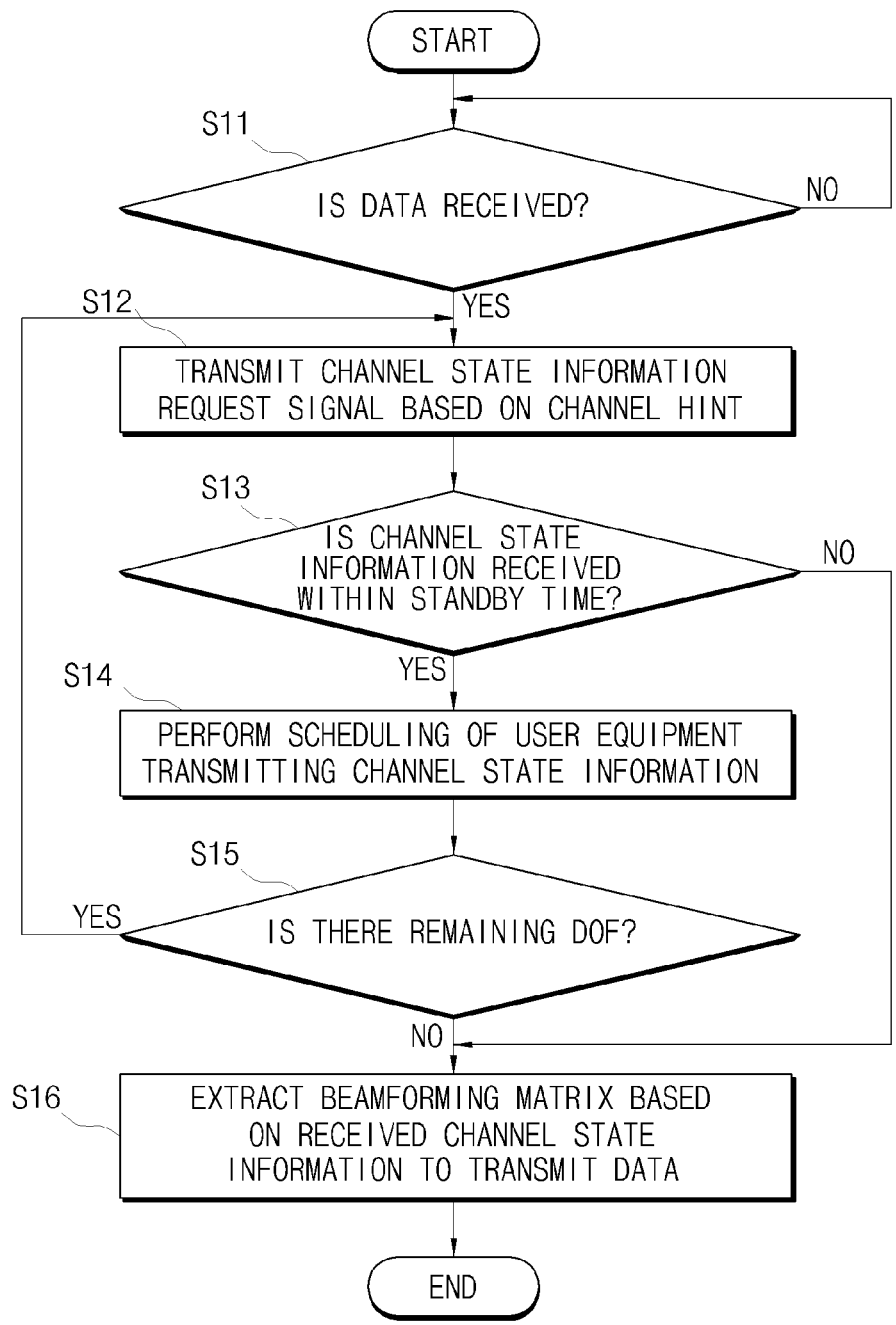
FIG. 4 is a flowchart for describing a detailed operation of a multi-data transmitter of FIG. 2 in a scheduling method of an MU-MIMO communication system according to an embodiment of the present invention.

FIG. 4 is a flowchart for describing a detailed operation of a multi-data transmitter of FIG. 2 in a scheduling method of an MU-MIMO communication system according to an embodiment of the present invention.

Referring to FIG. 4, in step S11, the multi-data transmitter 100 determines whether data to be transmitted to a user equipment 200 is received.

When the data is received as a result of the determination, the multi-data transmitter 100 transmits a channel state information request signal to a plurality of user equipment 200 in step S12.

In this case, in a case where the multi-data transmitter 100 transmits the channel state information request signal for the first time, the multi-data transmitter 100 transmits the channel state information request signal to the user equipment 200 which is set as a first user equipment, and when the channel state information request signal is not a signal which is transmitted for the first time, the multi-data transmitter 100 transmits the channel state information request signal to another user equipment 200 from which CSI is not received.

Since the channel state information request signal is not a signal which is transmitted for the first time, an ECV which is calculated based on previously received CSI is included in the channel state information request signal transmitted to the user equipment 200 from which the CSI is not received.

In step S13, the multi-data transmitter 100 transmitting the channel state information request signal determines whether the CSI is received from the plurality of user equipment 200 within a predetermined time.

When it is determined in step S13 that the CSI is not received within a standby time, the multi-data transmitter 100 terminates scheduling and extracts a beamforming matrix on the basis of all received CSI to transmit data to the plurality of user equipment 200 in step S16.

However, when it is determined in step S13 that the CSI is received within the standby time, the multi-data transmitter 100 performs scheduling of the user equipment 200 which transmits the CSI in step S14, and determines whether there is a remaining DoF in step S15.

When it is determined in step S15 that there is the DoF, step S12 of transmitting the channel state information request signal is performed. When it is determined in step S15 that there is not the DoF, the multi-data transmitter 100 terminates the scheduling and extracts the beamforming matrix on the basis of all the received CSI to transmit the data to the plurality of user equipment 200 in step S16.

Figure 5:
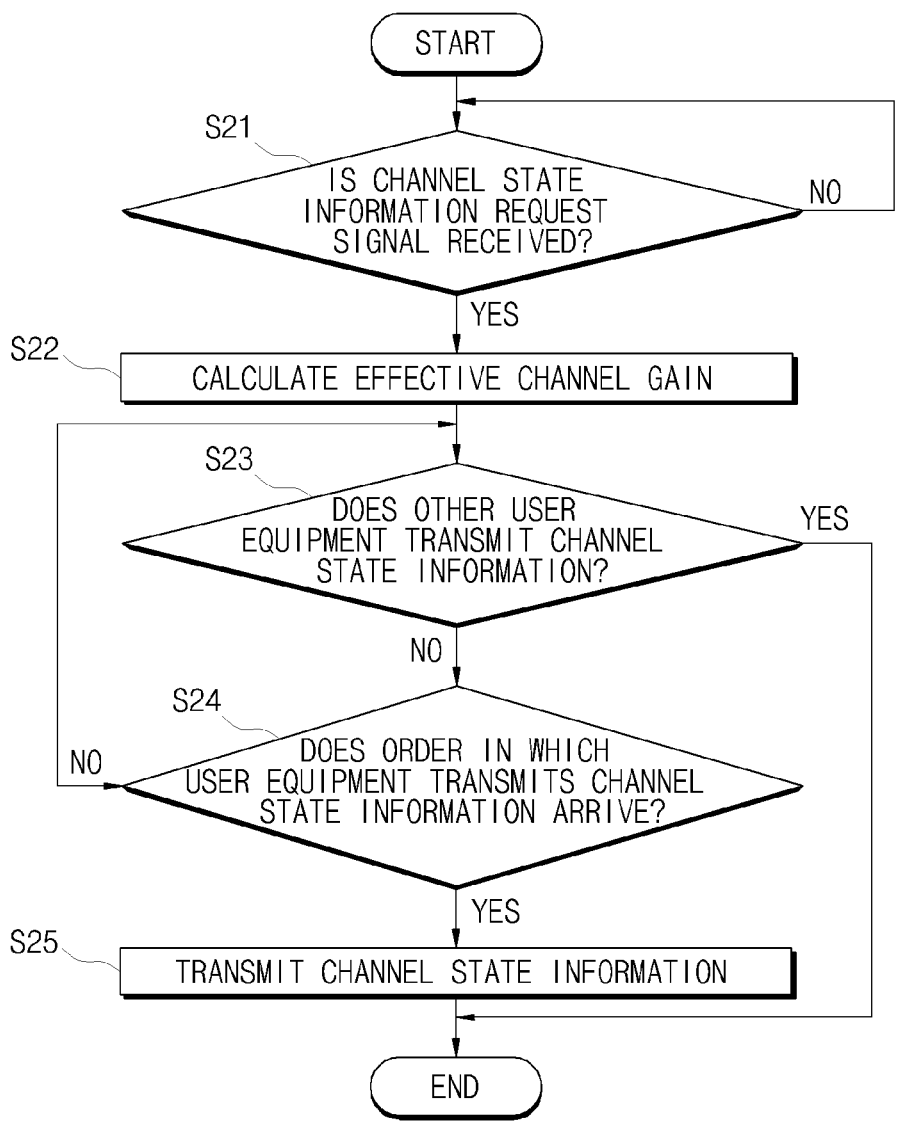
FIG. 5 is a flowchart for describing an operation of a user equipment of FIG. 2 in a scheduling method of an MU-MIMO communication system according to an embodiment of the present invention.

FIG. 5 is a flowchart for describing an operation of a user equipment of FIG. 2 in a scheduling method of an MU-MIMO communication system according to an embodiment of the present invention.

Referring to FIG. 15, in step S21, a user equipment 200 determines whether a channel state information request signal transmitted from the multi-data transmitter 100 is received.

When the channel state information request signal transmitted from the multi-data transmitter 100 is received as a result of the determination, the user equipment 200 calculates its ECG in step S22.

After the ECG is calculated, the user equipment 200 determines whether another user equipment 200 transmits CSI to the multi-data transmitter 100 in step S23.

When it is determined that the other user equipment 200 transmits the CSI to the multi-data transmitter 100, the user equipment 200 terminates an operation.

However, when it is determined in step S23 that the other user equipment 200 does not transmit the CSI to the multi-data transmitter 100, the other user equipment 200 determines whether an order (a timing) in which the other user equipment 200 transmits CSI to the multi-data transmitter 100 arrives in step S24.

When it is determined that the order (the timing) in which the other user equipment 200 transmits the CSI to the multi-data transmitter 100 arrives, step S23 is performed, and otherwise, the other user equipment 200 transmits the CSI to the multi-data transmitter 100 in step S25.

Figure 6:
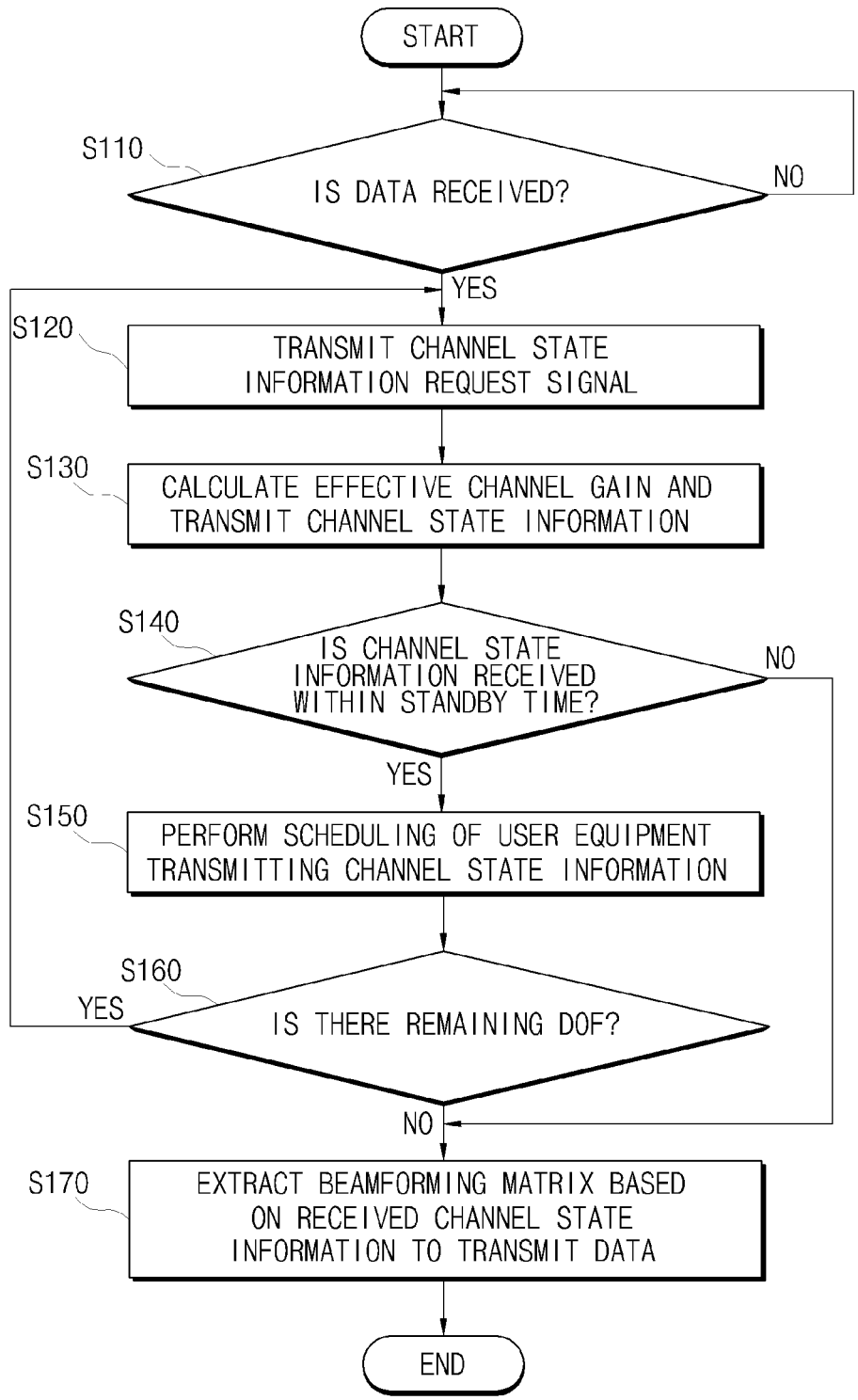
FIG. 6 is a flowchart for describing a scheduling method of an MU-MIMO communication system according to an embodiment of the present invention.

FIG. 6 is a flowchart for describing a scheduling method of an MU-MIMO communication system according to an embodiment of the present invention.

Referring to FIG. 6, in step S110, the multi-data transmitter 100 determines whether data to be transmitted to a user equipment 200 is received.

When the data is received as a result of the determination, the multi-data transmitter 100 transmits a channel state information request signal to a plurality of user equipment 200 in step S120. In this case, in a case where the multi-data transmitter 100 transmits the channel state information request signal for the first time, the multi-data transmitter 100 transmits the channel state information request signal to the user equipment 200 which is set as a first user equipment, and when the channel state information request signal is not a signal which is transmitted for the first time, the multi-data transmitter 200 transmits the channel state information request signal to the other user equipment 200 from which CSI is not received.

Since the channel state information request signal is not a signal which is transmitted for the first time, an ECV which is calculated based on previously received CSI is included in the channel state information request signal transmitted to the user equipment 200 from which the CSI is not received.

Each of a plurality of user equipment receiving the channel state information request signal transmitted from the multi-data transmitter 100 calculates its ECG, determines whether CSI is capable of being transmitted, and transmits its CSI to the multi-data transmitter 100 in step S130.

In this case, a user equipment 200 of which the calculated ECG is expected to be the highest may determine whether the CSI is capable of being transmitted, for transmitting the CSI.

Moreover, a plurality of user equipment 200 of which an ECG is predicted to be the highest determine whether other user equipment 200 has transmitted CSI to the multi-data transmitter 100, and transmit CSI, which is not transmitted to the multi-data transmitter 100 by the other user equipment 200, to the multi-data transmitter 100.

Moreover, when it is determined that the other user equipment 200 has transmitted the CSI to the multi-data transmitter 100, the plurality of user equipment 200 do not transmit the CSI to the multi-data transmitter 100.

Moreover, a plurality of user equipment 200 of which an ECG is predicted to be the highest determine whether another user equipment 200 has transmitted CSI to the multi-data transmitter 100, and when the other user equipment 200 does not transmit the CSI and an order in which each of the plurality of user equipment 200 transmits its CSI to the multi-data transmitter 100 arrives, each of the plurality of user equipment 200 transmits the CSI to the multi-data transmitter 100.

When the order in which each of the plurality of user equipment 200 transmits its CSI to the multi-data transmitter 100 does not arrive, each of the plurality of user equipment 200 continuously determines whether other user equipment transmits CSI.

Subsequently, the multi-data transmitter 100 determines whether CSI is received within a predetermined standby time in step S140. When it is determined in step S140 that the CSI is received within the predetermined standby time, scheduling of a user equipment transmitting CSI is performed in S150, and the multi-data transmitter 100 determines whether there is a remaining DoF in step S160.

When it is determined in step S140 that the CSI is not received within the predetermined standby time, the multi-data transmitter 100 terminates scheduling and extracts a beamforming matrix on the basis of all received CSI to transmit data to the plurality of user equipment 200 in step S170.

When it is determined in step S160 that there is the DoF, step S120 of transmitting the channel state information request signal is performed. When it is determined in step S160 that there is not the DoF, the multi-data transmitter 100 terminates the scheduling and extracts the beamforming matrix on the basis of all the received CSI to transmit the data to the plurality of user equipment 200 in step S170.

According to the embodiments of the present invention, a user equipment is scheduled based on the active exchange of CSI, and then, an access point or a base station transmits data to the user equipment, thereby obtaining a high scheduling gain and enhancing data transmission efficiency.

The scheduling method of the MU-MIMO communication system according to the embodiments of the present invention has been described according to the embodiments, but the scope of the present invention is not limited to a specific embodiment. The present invention may be corrected and modified within the technical scope obvious to those skilled in the art.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A scheduling method of a multi-user multi-input multi-output (MIMO) communication system, the scheduling method comprising:
   transmitting a channel state information request signal to a user equipment when data to be transmitted to the user equipment is received;
   calculating, by the user equipment receiving the channel state information request signal, an effective channel gain of the user equipment, determining whether channel state information (CSI) is capable of being transmitted, and transmitting the CSI of the user equipment according to a result of the determining;
   determining whether the CSI is received from the user equipment within a predetermined standby time; and
   when the CSI is received within the predetermined standby time, performing scheduling of the user equipment which has transmitted the CSI, determining whether a degree of freedom remains, and transmitting the channel state information request signal to another user equipment, from which CSI is not received, when the degree of freedom remains.

2. The scheduling method of claim 1, wherein the transmitting of the channel state information request signal comprises receiving data which is to be transmitted to the user equipment, and transmitting the channel state information request signal to another user equipment, which is set as a first user equipment, when the channel state information request signal is transmitted for a first time.

3. The scheduling method of claim 2, wherein the transmitting of the channel state information request signal comprises receiving the data which is to be transmitted to the user equipment, and transmitting the channel state information request signal to a plurality of user equipment, from which CSI is not received, when the channel state information request signal is not a signal which is transmitted for the first time.

4. The scheduling method of claim 3, wherein the channel state information request signal, which is transmitted to the plurality of user equipment from which the CSI is not received, comprises an effective channel vector which is calculated based on previously received CSI.

5. The scheduling method of claim 4, further comprising calculating, by a user equipment which receives the channel state information request signal including the effective channel vector, an effective channel gain by using the effective channel vector, determining whether another user equipment has transmitted CSI, and terminating a CSI transmitting operation when the other user equipment has transmitted the CSI.

6. The scheduling method of claim 5, further comprising calculating, by the user equipment which receives the channel state information request signal including the effective channel vector, the effective channel gain by using the effective channel vector, and when the other user equipment does not transmit the CSI, determining whether an order in which the user equipment transmits CSI arrives.

7. The scheduling method of claim 4, further comprising calculating, by the user equipment, a projection matrix on a basis of the effective channel vector to obtain the effective channel gain.

8. The scheduling method of claim 6, wherein,
   when the order in which the user equipment transmits the CSI does not arrive, the other user equipment determines whether another user equipment transmits CSI, and
   when the order in which the user equipment transmits the CSI arrives, the other equipment transmits the CSI.

9. The scheduling method of claim 1, wherein the determining of whether the CSI is received comprises:
   when the CSI is not received from the user equipment within the predetermined standby time,
   terminating scheduling;
   extracting a beamforming matrix, based on all CSI received from a plurality of user equipment; and
   transmitting data to the user equipment.

10. The scheduling method of claim 1, wherein the determining of whether the degree of freedom remains comprises:
    when it is determined the degree of freedom does not remain,
    terminating scheduling;
    extracting a beamforming matrix, based on all CSI received from a plurality of user equipment; and
    transmitting data to the user equipment.

* * * * *